United States Patent [19]

Jahn

[11] Patent Number: 4,518,736
[45] Date of Patent: May 21, 1985

[54] BORON NITRIDE PAINT FOR CERAMIC HOT PRESSING

[75] Inventor: Paul F. Jahn, Wixom, Mich.

[73] Assignee: Advanced Ceramic Systems, Inc., Livonia, Mich.

[21] Appl. No.: 597,670

[22] Filed: Apr. 6, 1984

[51] Int. Cl.³ ............................ C08K 3/38; C08K 5/05
[52] U.S. Cl. ...................................... 524/404; 524/379
[58] Field of Search ................................ 524/404, 379

[56] References Cited

U.S. PATENT DOCUMENTS 2,152,536  11/1935  Cooper ................................. 524/404

Primary Examiner—John Kight
Assistant Examiner—Marvin L. Moore
Attorney, Agent, or Firm—Lackenbach Siegel Marzullo Presta & Aronson

[57] ABSTRACT

A paint is formulated by combining fine boron nitride powder with a polymeric dispersion and a volatile liquid carrier, which paint is coated on ceramic preforms and subjected to hot pressing. The paint eliminates the formation of undesirable carbides on the surface of the pressed ceramic.

5 Claims, No Drawings

BORON NITRIDE PAINT FOR CERAMIC HOT PRESSING

FIELD OF THE INVENTION

This invention relates to a paint. Specifically, this invention relates to a paint useful in the hot pressing of ceramics.

BACKGROUND AND DISCUSSION OF THE PRIOR ART

In the hot pressing method of forming ceramics, the ceramics are under extremely high pressures and temperatures. The hot pressing apparatus inherently contains small amounts of air (i.e., oxygen), which oxygen combines with the carbon present to form carbonaceous gases, particularly carbon monoxide and carbon dioxide. These gases in turn formed undesirable carbides in the surface of the ceramic. The surface of the pressed ceramic had to be subjected to grinding to remove these carbides. This resulted in both a costly operation and loss of ceramic material.

It is known in forming ceramics to provide boron nitride (BN) powder on the ceramic as a release agent such as is disclosed in U.S. Pat. No. 4,252,768, granted Feb. 24, 1981 to Perkins et al.

Now there is provided by the present invention a paint which coats the ceramic preform and prevents undesirable carbides from forming on the hot pressed ceramic surface, and yet which paint may be readily removed so as to preserve substantially the entire ceramic.

It is therefore a principal object of the present invention to provide a new paint composition.

It is another principal object of the present invention to provide a paint and method as aforesaid in which the formation of undesirable carbides on the ceramic surface is eliminated.

It is still a further object of the present invention to minimize the loss of ceramic material in hot pressing.

SUMMARY OF THE INVENTION

A paint is coated on the surfaces of a ceramic preform before hot pressing, which paint combines boron nitride powder, a polymeric resin dispersion, and a volatilizable liquid carrier. When the liquid evaporates a protective boron nitride shield is formed on the ceramic.

DESCRIPTION OF THE PREFERRED EMBODIMENT

In one broad aspect, the present invention may be said to be the combination of boron nitride powder, polymeric resin dispersion; and a volatilizable liquid. In another respect the present invention may be said to be paint used in coating ceramic hot press preforms which paint combines fine boron nitride powder, an acrylic paint; and a volatizable liquid carrier.

Table I sets forth the weight ranges of the present paint composition.

TABLE I

| Component | Operable | Preferred |
|---|---|---|
| boron nitride | 50–100 | 60–80 |
| polymeric resin dispersion or paint | 25–75 | 40–60 |
| volatilizable liquid | 100–200 | 125–175 |

The boron nitride (BN) powder should be at least −200 mesh and preferably −325 mesh or submicron sized, the finer the better. The finer the BN particulates, the less weight of BN is required to coat a specific surface area of the ceramic preform. The BN is generally present in about ½ by weight of the entire paint formulation, on a wet basis.

Suitable polymeric resin paints include those with carbon black pigment and having an acrylic resin dispersion, and preferably a vinyl acrylic resin dispersion. A preferred paint is commercial grade acrylic paint having 2–4% pigment (e.g., carbon black), silicates 1–2% and vehicle 90–96% (e.g., acrylic resin, glycols and esters in combined in water). A broad range of polymeric dispersions are contemplated including vinyls, acrylics, methacrylics, latexes and the like. Typically as aforesaid the resin is dispersed in glycols, esters and water, and the carbon pigment is present in about 2–4% by weight and which may be combined with other pigments as well.

The volatilizable liquid is one that preferably air dries within a reasonable time and which does not react or combine with the other components. Alcohols are preferred, with the $C_1$–$C_3$ lower alcohols being most preferred. Water is also contemplated but is less preferred as it may require oven drying. It is of course understood that the acrylic paint itself has a liquid vehicle fraction which dries off simultaneously with the drying of the volatilizable liquid carrier.

In practicing the method of the invention, ceramic preforms are formed in the conventional manner and each preform is painted, dipped or sprayed with the composition of the present invention and allowed to air dry to form a BN coating which adheres to and forms a gaseous shield on the ceramic surface. The preforms are stacked with one or two layers of graphoil between the preforms. The preforms are hot pressed, preferably in vacuum, inert or reducing atmosphere to the extent possible. Hot pressing may be at temperatures of 600° to 2000° C. or more and pressures of about 500 to 4000 psi or more. After hot pressing, the ceramic parts need only be surface prepared by light sandblasting to remove the paint and any graphoil that may have adhered to the ceramic parts. It is believed that with this present process, the use of the graphoil may be eliminated if desired.

The following Example is specifically illustrative of the invention:

| The following composition was mixed at room temperature: | |
|---|---|
| BN powder (−325 mesh) | 70 g. |
| black acrylic paint (commercial grade) | 50 g. |
| methanol | 150 g. |

The surfaces of several ceramic discs were brush coated with two coats of the paint mixture, and the parts allowed to air dry for several minutes. The ceramic discs were then stacked, with 2 layers of graphoil between each pair of stacked discs in a graphite mold packed with carbon black. The stacked ceramic discs were then hot pressed at 1800° C. and 4000 psi. After pressing, the discs were unstacked and lightly sandblasted to remove residual paint and adhered graphoil. There were no signs of undesirable carbide formation on the discs.

The invention is not limited to any particular ceramic and a broad range of ceramics are contemplated including nitrides, borides, oxides and carbides. Suitable ceramics include by way of example $Si_3N_4$, AlN, $Al_2O_3$, and the like.

Although the invention has been shown and described with respect to detailed embodiments thereof, it should be understood by those skilled in this art that various changes and omissions in form and detail may be made therein without departing from the spirit and scope of the invention.

What is claimed is:

1. A paint for ceramic hot pressing comprising; boron nitride powder; an acrylic paint; and a volatizable liquid, having the following composition in parts by weight:
   boron nitride powder: 50–100
   acrylic paint: 25–75
   volatizable liquid: 100–200.

2. The paint of claim 1, wherein boron nitride is present in about 70 parts by weight; carbon black acrylic paint is present in about 50 parts by weight and the volatizable liquid is present in about 150 parts by weight.

3. The paint of claim 1, said acrylic being a vinyl acrylic.

4. The paint of claim 3, said liquid comprising an alcohol.

5. The paint of claim 4, said boron nitride being at least as fine as −200 mesh.

* * * * *